United States Patent Office 3,402,244
Patented Sept. 17, 1968

3,402,244
ANALGESIC AND ANTI-INFLAMMATORY
METHODS AND COMPOSITIONS
Carl D. Lunsford, Richmond, Va., assignor to A. H.
Robins Company, Incorporated, Richmond, Va., a corporation of Virginia
No Drawing. Original application Dec. 26, 1962, Ser. No. 247,351, now Patent No. 3,247,222, dated Apr. 19, 1966. Divided and this application June 22, 1965, Ser. No. 466,050
22 Claims. (Cl. 424—274)

The present application is a division of application Ser. No. 247,351, now U.S. Patent No. 3,247,222 filed Dec. 26, 1962, in which a requirement for restriction is of record, which application is in turn a continuation-in-part of application Ser. No. 233,916, filed Oct. 29, 1962, now abandoned.

The present invention relates to analgesic and anti-inflammatory agents and is more particularly concerned with certain alpha-(1-substituted-3-pyrrolidyl)-alpha-monocarbocyclic aryl - alpha - substituted N,N - disubstituted acetamides which possess a high degree of analgesic and anti-inflammatory activity, the preparation thereof, therapeutic compositions containing said acetamides as active ingredient, and a method of use of said compounds and compositions to combat, diminish, eliminate, ameliorate or alleviate pain and inflammation and symptons thereof in a living animal body.

Pain and inflammation are often intimately connected. Pain is often the first manifestation of injury to tissue, such as might later lead to inflammation, or of the presence of inflammation itself. Because of the intimacy of this connection it is highly desirable to have available analgesic agents possessing a high degree of anti-inflammatory activity and vice-versa. Because of the frequency with which compounds having high analgesic and/or anti-inflammatory activity produce undesirable side effects, such as dizziness, nausea, drowsiness, sweating, pruritus, dysphoria and mental depression and more serious forms of intoxication such as agranulocytosis and thrombocytopenia, it has been the object of considerable research to provide agents having the desired activities but which produce only negligible or readily tolerated side effects. Until the present time, such research has not been completely successful.

It is accordingly an object of the present invention to provide novel compounds which have a high degree of analgesic and anti-inflammatory activity. An additional object is the provision of compounds having analgesic and anti-inflammatory activity and which produce minimal side effects. Another object is to provide certain novel alpha-(1-substituted - 3 - pyrrolidyl)-alpha-monocarbocyclic aryl - alpha - substituted N,N - disubstituted acetamides. A further object is to provide a method of using said analgesic and anti-inflammatory agents and compositions thereof in the treatment of living animal and especially mammalian bodies. A still further object is to provide pharmaceutical compositions which embody the said agents. A still further object is to provide a method of preparing the said novel acetamides. Additional objects will be apparent to one skilled in the art and still other objects will become apparent hereinafter.

It has now been found that the foregoing and additional objects are accomplished by the provision of alpha-(1-substituted - 3 - pyrrolidyl) - alpha-monocarbocyclic aryl-alpha-substituted N,N-disubstituted acetamides and non-toxic pharmacologically acceptable acid addition salts thereof. These compounds are of particular interest in that they exhibit valuable analgesic and anti-inflammatory activity but a very low order of side effects upon administration.

The analgesic and anti-inflammatory agents of the present invention are preferably compounds having the formula:

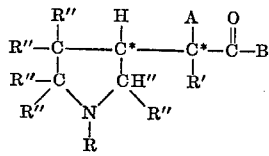

FORMULA I wherein R is lower-alkyl, cyclolakyl, or monocarbocyclic aralkyl, preferably lower-alkyl,
A is monocarbocyclic aryl, preferably phenyl,
R' is monocarbocyclic aryl or monocarbocyclic aralkyl, preferably monocarbocyclic aryl,
R'' is hydrogen or methyl, preferably a maximum of two R'' being other than hydrogen,
and B is a disubstituted basic nitrogen, preferably a di-lower-alkyl-amino radical,
and non-toxic, pharmacologically acceptable acid-addition salts thereof.

In the structural formula given above, the asterisks (*) serve to point out the asymmetric carbon atoms present in many of the compounds of the present invention, e.g., when A and R' are dissimilar. When two asymmetric centers are present, pairs of diastereoisomers are possible. These diastereoisomers, together with their optically active forms, are included within the scope of the present invention.

In the definition of symbols in the foregoing Formula (I) and where they appear elsewhere throughout this specification, the terms have the following significance:

By "monocarbocyclic aryl" radical is meant an aryl radical of the benzene series, having six ring carbon atoms, and this term includes the unsubstituted phenyl radical and phenyl radicals substituted by any non-toxic radical or radicals which are not reactive or otherwise interfering under the conditions of the reaction, such as lower-alkyl, lower-alkoxy, di-lower-alkyl-amino, trifluoromethyl, halo, and the like. The substituted-phenyl radicals have preferably no more than one to three substitutents such as those given above, and furthermore, these substitutents can be in various available positions of the phenyl nucleus and, where more than one substituent is present, can be the same or different and can be in various position combinations relative to each other. The lower-alkyl, lower-alkoxy, and di-lower-alkyl-amino radicals each preferably have from one to four carbon atoms which can be arranged as straight or branched chains. A total of nine carbon atoms in all ring substitutents is the preferred maximum.

The term "lower-alkyl" as used herein includes straight and branched chain radicals of up to eight carbon atoms inclusive and is exemplified by such groups as methyl, ethyl, propyl, isopropyl, tertiaryl butyl, amyl, isoamyl, hexyl, heptyl, octyl, and the like. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethyl-cyclohexyl, cycloheptyl, and cyclooctyl. Included in the term "monocarbocyclic aralkyl" are the radicals of lower-alkyl substituted monocarbocyclic aryl groups such as benzyl, phenethyl, methylbenzyl, phenpropyl, and the like. Such monocarbocyclic aralkyl radicals contain a maximum of eighteen carbon atoms.

When halogen is referred to herein, preferably, but not necessarily, a halogen of atomic weight in excess of nineteen but not greater than eighty is employed. Of the halogens chlorine is preferred.

Among the suitable tertiary amino radicals included within the symbol B are such radicals as di-lower-alkyl-amino, di(hydroxy-lower-alkyl)-amino, lower-alkyl-(hydroxy-lower-alkyl)-amino, basic saturated monocyclic heterocyclic radicals of less than twelve carbon atoms, as exemplified by piperidino, lower-alkyl-piperidino, e.g., 2-, 3-, or 4-lower-alkyl-piperidino, di-lower-alkyl-piperidino, e.g., 2,4-, 2,6-, and 3,5-di-lower-alkyl-piperidino, lower-alkoxy-piperidino, pyrrolidino, lower-alkyl-pyrrolidino, di-lower-alkyl-pyrrolidino, lower-alkoxy-pyrrolidino, morpholino, lower-alkyl-morpholino, lower-alkoxy-morpholino, di-lower-alkyl-morpholino, thiomorpholino, lower-alkyl-thiomorpholino, di-lower-alkyl-thiomorpholino, lower-alkoxy-thiomorpholino, piperazino, lower-alkyl-piperazino, $N^4$-(lower-alkyl)-C-(lower-alkyl)-piperazino, N-(hydroxy-lower-alkyl)-piperazino, N-(lower-aliphatic acyloxy lower-alkyl)-piperazino [e.g., N-acetoxy, isobutyroxy, or octanoyloxyethyl or propyl)-piperazino], lower-alkoxy-piperazino, N'-lower-alkoxy-lower-alkyl-piperazino, e.g., N'-ethoxyethyl-piperazino, and lower-carbalkoxy-piperazino. The terms "lower-alkyl" and "lower-alkoxy" when employed in the foregoing include radicals having carbon chains of straight or branched structure and contain not more than eight carbon atoms.

The compounds of the invention are most conveniently employed in the form of water-soluble, non-toxic acid-addition salts. Although the non-toxic salts are preferred, any salt may be prepared for use as a chemical intermediate, as in the preparation of another but non-toxic acid-addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions. Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, and tartaric acid. The preferred acid addition salt is the fumarate.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as ammonia, ammonium hydroxide, sodium carbonate or the like, extracting the liberated base with a suitable solvent, illustratively ethyl acetate or benzene, drying the extract, and evaporating to dryness or fractionally distilling, or in other conventional manner. When there are two or more basic nitrogen atoms present in the compounds of the invention, it is obvious that poly-acid-addition salts may be obtained by employing the proper increased molar ratio of acid to the free base.

The analgesic activity of the alpha-(1-substituted-3-pyrrolidyl)-alpha-substituted-alpha-monocarbocyclic aryl acetamides of the present invention, especially alpha (1-methyl-3-pyrrolidyl)-alpha, alpha-diphenyl-N,N-dimethyl-acetamide, as determined in lower animals, e.g., rats, is comparable to that of Darvon (d-propoxyphene hydrochloride) and the anti-inflammatory activity is comparable to that of phenylbutazone, but side effects are absent in most cases at or near lethal doses, far above those doses at which the compounds of the present invention are effective. For example, posture fixation, characteristic of narcotic analgesics, was not observed at dosage levels where the same was pronounced with d-propoxyphene hydrochloride.

A comparison of the activity of corresponding pyrrolidyl and piperidyl compounds showed the pyrrolidyl compounds to be far superior. The effective analgesic dose 50 for alpha-(1-methyl-3-pyrrolidyl)-alpha,alpha-diphenyl-N,N-dimethylacetamide, for example, was determined to be one hundred milligrams per kilogram in rats in a modification of the Randall and Selitto method [Archives Internationales de Pharmacodynamie et de Therapie CXIII, 233 (1957)]. This was an oral value. A corresponding piperidyl compound, alpha-(1-methyl-3-piperidyl)-alpha,alpha-diphenyl-N,N-diethylacetamide, produced convulsions at doses below the analgesic dose.

In their most advantageous form, the compositions of the present invention will contain a non-toxic pharmaceutical carrier in addition to the active ingredient. Exemplary carriers are: solids-lactose, magnesium stearate, calcium stearate, starch, terra alba, dicalcium phosphate, sucrose, talc, stearic acid, gelatin, agar, pectin, acacia, or the like; liquids—peanut oil, sesame oil, olive oil, water, or the like. The active agents of the invention can be most conveniently administered in such compositions containing about 0.01 to 67 percent, preferably 0.04 to 12.15 percent, by weight of the active ingredient. Such formulations are illustrated in Example 11.

A wide variety of pharmaceutical forms suitable for many modes of administration and dosages may be employed. For oral administration the active ingredient and pharmaceutical carrier may, for example, take the form of a pill, tablet, lozenge, or a liquid suspension; for parenteral administration, the composition may be a sterile solution; and for rectal administration, a suppository.

The method of using the compounds of the present invention comprises internally administering a compound of Formula I, usually in the form of a non-toxic, pharmachologically acceptable acid-addition salt, and preferably admixed with a pharmaceutical carrier, for example, in the form of any of the above-mentioned compositions, to alleviate inflammation and pain and symptoms thereof in a living animal body. The alpha-monocarbocyclic aryl-alpha-(1-substituted-3-pyrrolidyl)-alpha-substituted tertiary acetamides, especially alpha-(1-methyl-3-pyrrolidyl)-alpha,alpha-diphenyl-N,N-dimethylacetamide, and their non-toxic salts, especially the fumarate, may be advantageously employed in an amount of from about 0.1 to 200 milligrams per unit dose, preferably from about 2.5 to fifty milligrams for an oral dose, while parenteral dosages are usually less and ordinarily about one-half the oral dose so that the preferred parenteral unit dosage will be about one to 25 milligrams. The unit dose is preferably given a suitable number of times daily so that the daily dose may vary from 0.3 to 600 milligrams. Preferred daily dosages will vary from about 7.5 to 150 milligrams (oral) to about three to 75 milligrams (parenteral). However, these drugs are subject to wide variations in optimum daily and unit dosages, and the invention should therefore not be limited by the exact ranges stated. The exact dosage, both unit and daily, will of course have to be determined according to established medical principles. In addition, the active ingredients of the present invention or compositions containing the same may either be administered together with or include other physiologically active materials and/or medicaments, e.g., buffering agents, antacids, sedatives, stimulants, anticholinergics, other analgesics, or the like.

The high order of activity of the active agents of the present invention has been evidenced by tests in lower animals and representative of these are reported herein.

It would be expected that the compounds of the present invention could be prepared by standard amidation procedure from the appropriate alpha-pyrrolidyl-alpha-monocarbocyclic aryl-alpha-substituted acetyl halide. However, such acetyl halides are unstable, rearranging spontaneously or nearly spontaneously to the 4-(omega-haloalkyl)-2-pyrrolidinones. However, if the amide is prepared prior to tertiary substitution of the alphacarbon atom, the product is stable and possesses highly desirable analgesic and anti-inflammatory properties.

The active agents of the invention, the alpha-substituted alpha-(1-substituted-3-pyrrolidyl)-alpha-monocarbocyclic aryl N,N-disubstituted acetamides, are accordingly prepared by reacting a starting compound of the formula:

wherein A and B have the values previously assigned and wherein W is 1-substituted-3-pyrrolidyl (having the appropriate number of ring methyl substituents) or R′, R′ being monocarbocyclic aryl or monocarbocyclic aralkyl, with a compound of the formula:

wherein Z is 1-substituted-3-pyrrolidyl or monocarbocyclic aralkyl, and wherein X is a replaceable non-ring-substituted halogen, or an arylsulfonate radical such as the p-toluenesulfonate radical, or an alkylsulfonate radical such as the methanesulfonate radical, the 1-substituted-3-pyrrolidyl radical being present in only one of the starting materials A and B.

1-substituted-3-halopyrrolidines which may be used as starting intermediates are those tertiary pyrrolidines which have a halogen bonded to the heterocyclic ring in the three position. Exemplary 1-substituted-3-halopyrrolidines are 1-methyl-3-chloropyrrolidine, 1-ethyl-3-bromopyrrolidine, 1-propyl-3-iodopyrrolidine, 1-cyclohexyl-3-chloropyrrolidine, 1-phenethyl-3-bromopyrrolidine, 1-benzyl-3-chloropyrrolidine, and the like. The 1-substituted-3-halopyrrolidines may also have one or more methyl groups bonded to the ring in any one or more than one position, for example 1-ethyl-3-chloro-4-methylpyrrolidine, 1-isopropyl-3-iodo-2-methylpyrrolidine, 1-methyl-3-chloro-4-methylpyrrolidine, 1,2,2-, 1,4,4-, or 1,5,5-trimethyl-3-chloropyrrolidine, and the like. A suitable method for the preparation of starting 1-substituted-3-halopyrrolidines is found in the Journal of Medicinal and Pharmaceutical Chemistry 2, 523 (1960). Such starting halopyrrolidines, methyl-3-halopyrrolidines and polymethyl-3-halopyrrolidines may also be prepared by standard procedure from the 3-hydroxymethyl-pyrrolidines disclosed by C. W. Ryan et al., J. Org. Chem. 27, 2901-2905 (1962) or the related compounds disclosed by Lunsford in U.S. Patent 2,830,-997 and in other sources cited therein. 1-substituted-3-pyrrolidyl arylsulfonates and alkylsulfonates which may be used as starting intermediates are those tertiary pyrrolidines which have an arylsulfonoxy or alkylsulfonoxy group bonded to the heterocyclic ring in the 3-position. Exemplary 1-substituted-3-pyrrolidyl arylsulfonates and alkylsulfonates are 1-methyl-3-pyrrolidyl benzensulfonate, 1-ethyl-3-pyrrolidyl p-toluenesulfonate, 1-propyl-3-pyrrolidyl o-toluenesulfonate, 1-cyclohexyl-3-pyrrolidyl methanesulfonate, 1-benzyl-3-pyrrolidyl p-toluenesulfonate, and the like. Because of the reactivity of these intermediates they are most conveniently prepared in situ from the appropriate 1-substituted-3-pyrrolidinol and an aryl- or alkylsulfonyl chloride. By way of example, sodium amide is reacted with an equimolar quantity of a 1-substituted-3-pyrrolidinol in a solvent which is inert under the reaction conditions, such as toluene, to form a sodium 1-substituted-3-pyrrolidoxide salt which is then reacted with the aryl- or alkylsulfonyl chloride to give the desired intermediate.

Non-aryl halides which may alternatively be used as starting intermediates are those compounds wherein at least one replaceable halogen, preferably of atomic weight greater than nineteen, is present other than on an aryl nucleus. Examples of such halides include benzyl chloride, para-chloro, bromo, or fluorobenzyl chloride, para-N,N-dimethylaminobenzyl bromide, and the like.

The alpha-substituted-arylacetamides which are used as starting intermediates are N,N-disubstituted amides. These can be conveniently prepared from the selected arylacetamide and a replaceable halogen-, arylsulfonoxy-, or alkylsulfonoxy-containing compound otherwise corresponding to the desired 1-substituted-3-pyrrolidyl or aralkyl alpha-substituent of the desired alpha-substituted-arylacetamide intermediate. By way of example, a phenylacetamide may be reacted with an equimolar quantity of a 1-substituted-3-halopyrrolidine or an aralkyl halide, in the presence of an equimolar quantity of a suitable metal carbanion-forming reagent, to yield the desired alpha-substituted-phenyl-acetamide. The alpha-(mono-substituted)-phenylacetamide is the primary product. Although both alpha hydrogen atoms of an alpha-phenylacetamide are quite reactive, replacement of one of the two alpha hydrogens considerably reduces the reactivity of the remaining hydrogen. By controlling the quantity of reactants only one hydrogen atom can be selectively reacted, giving primarily the mono-substituted product.

Numerous alpha-substituted-arylacetamides, for instance diphenylacetamides, may be conveniently prepared from the corresponding alpha-substituted-arylacetyl chloride according to any convenient or conventional method for preparing amides from acid halides. The preparation of such amides is reported in the Journal of the University of Bombay 16, 32 (1948), abstracted in Chemical Abstracts 43, 1144D.

Representative examples of starting alpha-substituted-monocarbocyclic aryl tertiary acetamides are alpha-(1-ethyl-3-pyrrolidyl)-alpha-phenyl-N,N-diethylacetamide,
1-[alpha-(1-methyl-3-pyrrolidyl)-alpha-phenylacetyl]-pyrrolidine,
4-[alpha-(1-isopropyl-4-methyl-3-pyrrolidyl)-alpha-phenylacetyl]-morpholine,
alpha(1-isopropyl-3-pyrrolidyl)-alpha-phenyl-N,N-dimethylacetamide,
4-(alpha-benzyl-alpha-phenylacetyl)-morpholine,
1-[alpha-(p-chlorobenzyl)-alpha-phenylacetyl]-pyrrolidine,
alpha,alpha-diphenyl-N,N-diethylacetamide,
alpha,alpha-ditolyl-N,N-dimethylacetamide,
alpha-(p-methoxyphenyl)-alpha-(m-trifluoromethylphenyl)-N,N-diethylacetamide,
alpha-(p-methoxyphenyl)-alpha-phenyl-N,N-diethylacetamide,
alpha-(m-trifluoromethylphenyl)-alpha-phenyl-N,N-di(hydroxyethyl)acetamide,
alpha-(p-chlorophenyl)-alpha-(1-cyclohexyl-2-methyl-3-pyrrolidyl)-N-methyl-N-ethylacetamide,
alpha-(p-tolyl)-alpha-(1-ethyl-4-methyl-3-pyrrolidyl)-N-ethyl-N-hydroxyethylacetamide, and the like.

The reaction is essentially an "alkylation" at the alpha carbon atom of the arylacetamide, and is therefore conducted in the presence of a metal reagent capable of replacing the alpha hydrogen atom of the arylacetamide to produce a carbanion, preferably a compound of a metal from Group I or II of the Periodic Table. This includes the alkali and alkaline earth metals such as sodium, potassium, lithium, calcium, and the like, as such or in the form of their amides, hydrides, alcoholates or hydrocarbon compounds, such as for example sodamide, sodium hydride, sodium ethoxide, potassium-tertiary butylate, potassium-tertiary amylate, butyl-lithium, phenyl-sodium, phenyl-lithium, or the like. Sodamide is usually preferred. Such compounds are hereinafter referred to as alkali and alkaline earth carbanion-forming reagents. The resulting carbanion intermediate reacts in situ with the organic halide, arylsulfonate, or alkylsulfonate reactant to produce the desired organic substitution at the alpha carbon atom of the starting arylacetamide.

In a preferred procedure for carrying out the reaction, the starting substituted acetamide is heated, generally to reflux, with an equimolar quantity of carbanion-forming reagent, preferably until the hydrogen replacement step is complete. By way of example, this is evidenced by cessation of ammonia evolution when sodium amide is used. The reaction is preferably conducted in the presence of an organic solvent which is inert to the reactants and reaction products under the conditions of reaction, such as an alkyl or aryl hydrocarbon, e.g., benzene, toluene, xylene, hexane, et cetera, or an ether such as ethyl ether or the like. One to two liters of solvent per mole of starting acetamide is satisfactory, although the quantity of solvent may obviously be varied over a much wider range. The halogenated, arylsulfonated, or alkylsulfonated reactant, Z—X (as defined above, is added to the resulting solution or suspension of the metal salt with stirring, usually in a dropwise manner at or about reflux, and the reaction is carried to completion by continued heating of the reaction mixture, generally for no more than about forty-eight hours, usually fifteen to thirty hours, or in some cases simply by allowing it to stand at room temperature for a sufficient period. In an alternate procedure, all the reactants are mixed at once and the reaction allowed to proceed to completion.

Upon completion of the reaction, the product is recovered according to any convenient procedure. For example, the reaction mixture may be cooled, filtered, concentrated, and subjected to an acid-base extraction to remove acid-insoluble materials, the product finally being extracted into an organic solvent, e.g., ether. In a typical acid-base extraction, the solution is extracted with acid, conveniently hydrochloric acid, and the acid extract made basic with a base such as an alkali metal carbonate or hydroxide, for example sodium hydroxide. The product is then extracted with a water-immiscible organic solvent such as ethyl ether or the like, and the resulting organic extract dried over a drying agent, for instance anhydrous sodium sulfate, and finally filtered and concentrated. The final product may be obtained by distillation under reduced pressure. Alternatively, the product may be recovered by fractionally distilling the reaction mixture under reduced pressure or in any other conventional manner.

The following examples and preparations are given by way of illustration only and are not to be construed as limiting.

Preparation 1.—4-[alpha-(1-isopropyl-3-pyrrolidyl)-alpha-phenylacetyl]-morpholine maleate A suspension of 21.6 grams (0.55 mole) of sodamide in a solution of 102.5 grams (0.5 mole) of 4-(alpha-phenylacetyl)-morpholine in one liter of dry toluene was heated slowly to reflux and refluxing continued until ammonia was no longer evolved, after which 81.0 grams (0.55 mole) of 1-isopropyl-3-chloropyrrolidine was added dropwise and heating continued for thirty hours. The reaction mixture was stirred during the entire operation. The reaction mixture was cooled, filtered and concentrated, and then partitioned between three normal hydrochloric acid and ether. The acid extract was made basic with concentrated sodium hydroxide and extracted with ether. This ether extract was washed, dried over anhydrous sodium sulfate and concentrated under a vacuum. The residue was distilled, yielding 98.4 grams of a pale yellow viscous oil boiling at 160 to 164 degrees centigrade at 0.02 millimeter of mercury pressure. This corresponds to a 63 percent yield.

*Analysis.*—Calculated for $C_{19}H_{28}N_2O_2$: N, 4.43. Found: N, 4.11.

The maleate salt was prepared by dissolving equimolar quantities of the base and maleic acid in isopropyl alcohol, followed by dilution with ethyl ether. The resulting white crystalline salt melted at 145 to 146 degrees centigrade.

1 - [alpha - (1 - isopropyl - 3 - pyrrolidyl) - alphaphenylacetyl]-pyrrolidine, alpha-(1-isopropyl-3 - pyrrolidyl)-alpha-phenyl-N,N-diethylacetamide, and alpha-(1-isopropyl-3 - pyrrolidyl)-alpha-phenyl-N,N-dimethylacetamide were prepared in the manner of Preparation 1 using in each case 1-isopropyl-3-chloropyrrolidine with (a) 1-(phenylacetyl)-pyrrolidine, (b) N,N-diethylphenylacetamide, and (c) N,N-dimethylphenylacetamide, respectively. They were then converted to the maleate salt.

Preparation 2.—Alpha-(1-ethyl-3-pyrrolidyl)-alpha-phenyl-N,N-dimethylacetamide

A suspension of 25.0 grams (0.64 mole) of sodamide in a solution of 104 grams (0.64 mole) of N,N-dimethylphenylacetamide in five hundred milliliters of dry xylene was stirred and slowly heated to reflux temperature and maintained at that temperature for one hour, whereupon 85.5 grams (0.64 mole) of 1-ethyl-3-chloropyrrolidine in one hundred milliliters of xylene were added. The mixture was refluxed and stirred for fifteen hours, cooled and extracted with three normal hydrochloric acid. The acid extract was made basic with concentrated sodium hydroxide solution and extracted with ether. The ether extract was washed with water, dried over anhydrous sodium sulfate, and concentrated under a vacuum. The residue, a yield of 47 percent, distilled at 135 to 139 degrees centigrade at 0.1 millimeter of mercury. The hydrochloride salt melted at 214–215 degrees centigrade.

Alpha-(1-ethyl-3-pyrrolidyl)-alpha-phenyl-N,N-diethylacetamide and 1-[alpha - (1 - ethyl - 3 - pyrrolidyl)-alpha-phenylacetyl]-pyrrolidine were prepared in the manner of Preparation 2 using in each case 1-ethyl-3-chloropyrrolidine with (a) N,N-diethylphenylacetamide and (b) 1-(phenylacetyl)-pyrrolidine, respectively.

Preparation 3.—Alpha-[1,4(or 1,5)-dimethyl-3-pyrrolidyl]-alpha-phenyl-N,N-dimethylacetamide Alpha-(1,4-dimethyl - 3 - pyrrolidyl)-alpha-phenyl-N,N-dimethylacetamide is prepared according to the method of Preparation 2 from equimolar quantities of N,N-dimethylphenylacetamide and 1,4-dimethyl-3-chloropyrrolidine.

Alpha - (1,5 - dimethyl - 3 - pyrrolidyl) - alpha - phenyl-N,N-dimethylacetamide is prepared from N,N-dimethylphenylacetamide and 1,5-dimethyl-3-chloropyrrolidine in the same manner.

Typical alpha-(1-substituted-3 - pyrrolidyl)-alpha-arylacetamide starting materials prepared according to the procedures of the foregoing preparations are given in Table I. Additional starting materials of the same type are likewise prepared from the selected starting materials in the manner of the foregoing preparations.

EXAMPLE 1.—ALPHA-(1-ISOPROPYL-3 - PYRROLIDYL)-ALPHA,ALPHA-DIPHENYL-N,N - DIMETHYLACETAMIDE

A suspension of 39.02 grams (one mole) of sodamide in a solution of 239.30 grams (one mole) of N,N-dimethyldiphenylacetamide in two liters of dry benzene was heated slowly to reflux and reflux continued until ammonia was no longer liberated. A solution of 147.65 grams (one mole) of 1-isopropyl-3-chloropyrrolidine in three hundred milliliters of benzene was then added dropwise and stirring and heating at reflux were continued for 48 hours. The mixture was cooled and extracted with dilute hydrochloric acid. The acid extract was made basic with dilute sodium hydroxide and extracted with ether. The ether extracts were dried and concentrated and the residue distilled under a vacuum. A total of 32.5 grams of the product, boiling at 185 to 190 degrees centigrade at 0.05 millimeter of mercury pressure, were collected. This corresponds to a 23.6 percent yield.

Alpha - (1 - ethyl - 3 - pyrrolidyl) - alpha,alpha-diphenyl-N,N-dimethylacetamide was prepared in the manner of Example 1 from N,N-dimethyldiphenylacetamide and 1-ethyl-3-chloropyrrolidine.

EXAMPLE 2.—ALPHA-(1-METHYL - 3 - PYRROLIDYL) - ALPHA,ALPHA - DIPHENYL - N,N - DIMETHYLACETAMIDE

To a suspension of twenty grams (0.5 mole) of sodium amide in 750 milliliters of dry toluene there was added 50.6 grams (0.5 mole) of 1-methyl-3-pyrrolidinol dropwise with stirring and cooling below thirty degrees centigrade. After addition was complete the mixture was stirred for one hour and 95.3 grams (0.5 mole) of p-toluenesulfonyl chloride in 500 milliliters of dry toluene was added rapidly at a temperature below ten degrees centigrade. The mixture was stirred for two hours at room temperature, washed with cold water, dried over magnesium sulfate and concentrated to 250 milliliters volume. This solution was used as follows:

A mixture of 93.5 grams (0.39 mole) of alpha,alpha-diphenyl-N,N-dimethylacetamide in 500 milliliters of dry toluene and 15.6 grams (0.4 mole) of sodium amide was stirred and refluxed for three hours. The toluene solution of the p-toluenesulfonate as prepared above was then added to the refluxing reaction mixture and refluxing and stirring were continued for three hours. The resulting mixture was filtered and extracted with six normal hydrochloric acid. This acid extract was washed with ether, made basic with six normal sodium hydroxide and extracted with ether. The ether extracts were dried over magnesium sulfate and concentrated. The residue was distilled at reduced pressure giving a 38% yield of the product which boiled at 175–180 degrees centigrade/0.005 mm.

EXAMPLE 3.—ALPHA-(1-METHYL - 3 - PYRROLIDYL) - ALPHA,ALPHA - DIPHENYL - N,N - DIMETHYLACETAMIDE TARTRATE AND FUMARATE

The free basic compound, alpha-(1-methyl-3-pyrrolidyl)-alpha,alpha-diphenyl - N,N - dimethylacetamide, as prepared in Example 2, or in the manner of Example 1 from 1-methyl-3-chloropyrrolidine and N,N-dimethyldiphenylacetamide, was mixed with an equimolar weight of tartaric acid in an isopropanol-isopropyl ether mixture and the tartrate salt crystallized out. The salt melted at 170 to 171 degrees centigrade.

The fumarate salt was prepared in the same manner.

EXAMPLE 4.—4-[ALPHA - BENZYL - ALPHA - (1-ISOPROPYL - 3 - PYRROLIDYL)-ALPHA-PHENYLACETYL]-MORPHOLINE MALEATE

A mixture of fifty grams (0.16 mole) of 4-[alpha-(1-isopropyl - 3-pyrrolidyl)-alpha-phenylacetyl]-morpholine as prepared in Preparation 1 and 6.4 grams (0.16 mole) of sodamide in five hundred milliliters of dry benzene was heated with stirring until ammonia was no longer evolved. The reaction mixture was then cooled to ten degrees centigrade and, while stirring was continued, 20.25 grams (0.16 mole) of benzyl chloride in an equal volume of benzene were added dropwise. After stirring at room temperature for 24 hours, the mixture was filtered and concentrated and the residue was fractionated at reduced pressure. The fraction boiling from 194 to 202 degrees centrigrade at 0.03 millimeter of mercury was collected. It weighted sixteen grams, corresponding to a 37 percent yield.

The free base was converted to the maleate salt by heating with an equimolar quantity of maleic acid in an isopropanol-ethyl ether mixture. The salt was recrystallized from an isopropanol-ethyl ether solution. The melting point was 205 to 206 degrees centigrade.

1-[-alpha-benzyl-alpha-(1-isopropyl - 3 - pyrrolidyl)-alpha-phenylacetyl]-pyrrolidine and its maleate, alpha-benzyl-alpha-(1-isopropyl - 3 - pyrrolidyl)-alpha-phenyl-N,N-diethylacetamide and its tartrate, alpha-benzyl-alpha-(1-isopropyl - 3 - pyrrolidyl)-alpha-phenyl-N,N-dimethylacetamide and its maleate, and alpha-benzyl-alpha-(1-ethyl - 3 - pyrrolidyl)-alpha-phenyl-N,N-diethylacetamide and its tartrate, were prepared in the manner of Examples 1 to 4 from benzyl chloride and 1-[alpha-(1-isopropyl - 3 - pyrrolidyl) - alpha-phenylacetyl]-pyrrolidine, alpha-(1-isopropyl - 3 - pyrrolidyl)-alpha-phenyl-N,N-diethylacetamide, alpha-(1-isopropyl - 3 - pyrrolidyl)-alpha-phenyl - N,N - dimethylacetamide, and alpha-(1-ethyl - 3 - pyrrolidyl)-alpha-phenyl-N,N-diethylacetamide, respectively.

EXAMPLE 5.—ALPHA - [1,4(OR 1,5-) - DIMETHYL-3-PYRROLIDYL) - ALPHA - BENZYL - ALPHA-PHENYL - N,N-DIMETHYLACETAMIDE MALEATE

In the manner of Example 4, alpha-(1,4-dimethyl-3-pyrrolidyl)-alpha-benzyl-alpha-phenyl - N,N - dimethylacetamide is prepared from equimolar quantities of benzyl chloride and alpha-(1,4-dimethyl-3-pyrrolidyl)-alpha-phenyl-N,N-dimethylacetamide.

Alpha-(1,5-dimethyl - 3 - pyrrolidyl)-alpha-benzyl-alpha-phenyl-N,N-dimethylacetamide maleate is prepared from benzyl chloride and alpha-(1,5-dimethyl-3-pyrrolidyl)-alpha-phenyl-N,N-dimethylacetamide in the same manner.

EXAMPLE 6.—OTHER ALPHA - (1-SUBSTITUTED-3-PYRROLIDYL) - ALPHA - SUBSTITUTED - ALPHA-PHENYL - N,N - DISUBSTITUTED - ACETAMIDES

In the manner of Example 4, the following compounds are prepared:

alpha-(1-isopropyl-3-pyrrolidyl)-alpha-(para-chlorobenzyl)-alpha-phenyl-N,N-dimethylacetamide from para-chlorobenzyl chloride and alpha-(1-isopropyl-3-pyrrolidyl)-alpha-phenyl-N,N-dimethylacetamide;

alpha-(1-isopropyl-3-pyrrolidyl)-alpha-(para-ethoxybenzyl)-alpha-phenyl-N,N-dimethylacetamide from para-ethoxybenzyl chloride and alpha-(1-isopropyl-3-pyrrolidyl)-alpha-phenyl-N,N-dimethylacetamide;

alpha-(1-isopropyl-3-pyrrolidyl)-alpha-(para-N,N-dimethyl-aminobenzyl)-alpha-phenyl-N,N-dimethylacetamide from para-N,N-dimethylaminobenzyl chloride and alpha-(1-isopropyl-3-pyrrolidyl)-alpha-phenyl-N,N-dimethylacetamide;

alpha-(1-isopropyl-3-pyrrolidyl)-alpha-(para-trifluoromethylbenzyl)-alpha-phenyl-N,N-dimethylacetamide from para-trifluoromethylbenzyl chloride and alpha-(1-isopropyl-3-pyrrolidyl)-alpha-phenyl-N,N-dimethylacetamide; and alpha-(1-isopropyl-3-pyrrolidyl)-alpha-(meta-methylbenzyl)-alpha-phenyl-N,N-dimethylacetamide from meta-methylbenzyl chloride and alpha-(1-isopropyl-3-pyrrolidyl)-alpha-phenyl-N,N-dimethylacetamide.

EXAMPLE 7.—ALPHA-(1-CYCLOHEXYL-2 - METHYL-3-PYRROLIDYL)-ALPHA,ALPHA-DI - (P-TOLYL)-N,N-DIMETHYLACETAMIDE

In the manner given in Example 4, alpha-(1-cyclohexyl-2-methyl-3-pyrrolidyl)-alpha,alpha - di(p - tolyl)-N,N-dimethylacetamide is prepared from alpha,alpha-di(p-tolyl)-N,N-dimethylacetamide and 1-cyclohexyl-2-methyl-3-chloropyrrolidine.

EXAMPLE 8.—ALPHA-(1,2,2-TRIMETHYL - 3 - PYRROLIDYL) - ALPHA - (P - METHOXYPHENYL)-ALPHA-PHENYL-N,N-DIMETHYLACETAMIDE

In the manner given in Example 4, alpha-(1,2,2-trimethyl-3-pyrrolidyl)-alpha-(p - methoxyphenyl) - alpha-phenyl-N,N-dimethylacetamide is prepared from alpha- (1,2,2-trimethyl-3-chloropyrrolidine and alpha-(p - methoxyphenyl)-alpha-phenyl-N,N-dimethylacetamide.

EXAMPLE 9.—ALPHA-(1-ETHYL - 3 - PYRROLIDYL)-ALPHA-(P - METHOXYPHENYL) - ALPHA-(M - TRIFLUOROMETHYLPHENYL) - N,N - DIMETHYLACETAMIDE

In the manner given in Example 4, alpha-(1-ethyl-3-pyrrolidyl - alpha-(p - methoxyphenyl) - alpha - (m - trifluoromethylphenyl)-N,N-dimethylacetamide is prepared from alpha-(p - methoxyphenyl) - alpha - (m - trifluoromethylphenyl)-N,N-dimethylacetamide and 1 - ethyl - 3-bromopyrrolidine.

EXAMPLE 10.—ALPHA - (1 - BENZYL - 3 - PYRROLIDYL) - ALPHA - (P - CHLOROPHENYL)-ALPHA-PHENYL-N,N-DIMETHYLACETAMIDE

In the manner given in Example 4, alpha-(1-benzyl-3-pyrrolidyl) - alpha - (p - chlorophenyl) - alpha - phenyl-N,N-dimethylacetamide is prepared from alpha-(p-chlorophenyl) - alpha - phenyl - N,N - dimethylacetamide and 1-benzyl-3-bromopyrrolidine.

A tabulation of typical alpha-(1-substituted-3-pyrrolidyl)-alpha-phenylacetamide products prepared and employed according to the present invention is presented in Table II.

EXAMPLE 11.—FORMULATIONS

The following formulations are representative for all of the pharmacologically active compounds of the invention, but have been particularly designed to embody as active ingredient an alpha-(1-lower-alkyl-3 - pyrrolidyl) - alpha, alpha-diphenyl tertiary acetamide, and especially a pharmacologically acceptable salt thereof, for example alpha-(1-methyl-3-pyrrolidyl)-alpha,alpha - diphenyl - N,N - dimethylacetamide as its tartrate, hydrochloride, hydrobromide, fumarate, or like pharmacologically acceptable salt.

(1) Capsules.—Capsules of 5, 25, and 50 milligrams of active ingredient per capsule are prepared. With the higher amounts of active ingredient, reduction may be made in the amount of lactose.

| Typical blend for encapsulation: | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and may be as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium Stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) Tablets.—A typical formulation for a tablet containing five milligrams of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend 1, 2, 4 and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

(A) 50 mg. Tablet

| Ingredients: | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

(B) 100 mg. Tablet

| Ingredients: | Per tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

For A or B, uniformly blend the active ingredient, lactose, starches, and dicalcium phosphate when present. The blend is then granulated using water as a granulating medium. The wet granules are passed through an eight-mesh screen and dried at 140–160° Fahrenheit overnight. The dried granules are passed through a ten-mesh screen, blended with the proper amount of calcium stearate, and the lubricated granules then converted into tablets on a suitable tablet press.

(C) 250 mg. Tablet

| Ingredients | Per tablet, mg. |
|---|---|
| Active ingredient, as salt | 250.0 |
| Corn starch | 56.0 |
| Carbowax 6000 (polethylene glycol of M.W. approximately 6000) | 25.0 |
| Lactose | 35.0 |
| Magnesium stearate | 4.0 |
| Total | 370.0 |

Uniformly blend the active ingredient, Carbowax 6000, lactose and one-half the weight of magnesium stearate required. This blend is then "slugged" on a suitable tablet press. These "slugs" are granulated through a ten-mesh screen on an oscillating granulator. These granules are then blended with the remainder of the magnesium stearate and the lubricated granules are then converted into tablets on a suitable tablet press.

(D) 500 mg. Tablet

| Ingredients: | Per tablet, mg. |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through an eight-mesh screen. These wet granules are dried overnight at 140–160 degrees Fahrenheit. The dried granules are passed through a ten-mesh screen. The dried granules and weighted amounts of corn starch and calcium stearate are uniformly blended and these lubricated granules are compressed on a suitable tablet press.

(3) Injectable—2% sterile solution  Per cc.
   Active ingredient _____ mg__ 20
   Preservative, e.g., chlorobutanol
      percent wt./v. _____ 0.5
   Water for injection _____ q.s.

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspension or syrups, and in other acceptable dosage forms.

Although very small quantities of the active materials of the present invention are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result, e.g., analgesic or antiinflammatory, desired. The exact individual dosages as well as daily dosages in a particular case will of course be determined according to established medical principles. Results upon administration of these novel materials have thus far proved extremely gratifying.

Various modifications in the compounds, compositions and methods of the invention will be apparent to one skilled in the art and may be made without departing from the spirit or scope thereof, and it is therefore to be understood that the invention is to be limited only by the scope of the appended claims.

TABLE I.—ALPHA-(1-SUBSTITUTED-3-PYRROLIDYL)-ALPHA-PHENYLACETAMIDES

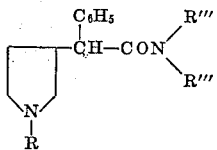

| R | N<R'''><R'''> | Salt | (B.P.) M.P., °C./mm. | Empirical formula | ANALYSIS C, Calcd. Found | H, Calcd. Found | N, Calcd. Found |
|---|---|---|---|---|---|---|---|
| $C_2H_5$ | $N(CH_3)_2$ | HCl | 214–215 | $C_{15}H_{25}ClN_2O$ | 64.74 / 64.94 | 8.49 / 8.74 | 9.44 / 9.39 |
| $C_2H_5$ | $N(C_2H_5)_2$ | | (114–118/0.005) | $C_{18}H_{28}N_2O$ | 74.95 / 75.11 | 9.79 / 9.75 | 4.85 / 4.56 |
| $C_2H_5$ | Pyrrolidino | Maleate | 154–155 | $C_{22}H_{30}N_2O_5$ | 65.65 | 7.51 | 6.96 / 6.93 |
| i-$C_3H_7$ | $N(CH_3)_2$ | do | 139–140 | $C_{21}H_{30}N_2O_5$ | 64.59 / 64.55 | 7.74 / 7.83 | 7.17 / 7.75 |
| i-$C_3H_7$ | $N(C_2H_5)_2$ | do | 107–108 | $C_{23}H_{34}N_2O_5$ | 66.00 / 65.81 | 8.19 / 8.30 | 6.69 / 6.40 |
| i-$C_3H_7$ | Pyrrolidino | do | 172–172.5 | $C_{23}H_{32}N_2O_5$ | 66.32 / 66.48 | 7.74 / 8.02 | 6.73 / 6.53 |
| i-$C_3H_7$ | Morpholino | do | 145–146 | $C_{23}H_{32}N_2O_6$ | 63.87 / 63.80 | 7.46 / 7.54 | 6.48 / 6.08 |

TABLE II.—ALPHA-(1-SUBSTITUTED-3-PYRROLIDYL)-APLHA-SUBSTITUTED-PHENYLACETAMIDES

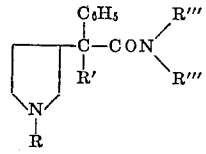

| R | R' | N<R'''><R'''> | Salt | (B.P.) M.P. °C./mm. | Empirical Formula | ANALYSIS C, Calcd. Found | H, Calcd. Found | N, Calcd. Found |
|---|---|---|---|---|---|---|---|---|
| $CH_3$ | $C_6H_5$ | $N(CH_3)_2$ | | (185–194/0.08) | $C_{21}H_{26}N_2O$ | | | 8.69 / 8.56 |
| $CH_3$ | $C_6H_5$ | $N(CH_3)_2$ | Tartrate | 170–171 | $C_{25}H_{32}N_2O_7$ | 63.54 / 63.04 | 6.83 / 6.68 | 5.93 / 6.04 |
| $CH_3$ | $C_6H_5$ | $H(CH_3)_2$ | Fumarate | 222–223 | $C_{25}H_{30}N_2O_5$ | | | 6.39 / 6.58 |
| $C_2H_5$ | $C_6H_5$ | $N(C_2H_5)_2$ | | 90–91 | $C_{22}H_{34}N_2O$ | 79.32 / 79.19 | 9.05 / 9.01 | 7.40 / 7.22 |
| i-$C_3H_7$ | $C_6H_5$ | $N(CH_3)_2$ | | (185–190/0.05) | $C_{23}H_{30}N_2O$ | 78.81 / 78.61 | 8.63 / 8.45 | 7.99 / 7.88 |
| i-$C_3H_7$ | $CH_2C_6H_5$ | $N(CH_3)_2$ | | 148, 149 | $C_{24}H_{32}N_2O$ | 79.07 / 80.29 | 8.85 / 8.87 | 7.69 / 7.83 |
| i-$C_3H_7$ | $CH_2C_6H_5$ | $N(CH_3)_2$ | Maleate | 167–168 | $C_{28}H_{36}N_2O_5$ | 69.97 / 69.81 | 7.55 / 7.67 | 5.83 / 5.95 |
| i-$C_3H_7$ | $CH_2C_6H_5$ | $N(CH_3)_2$ | do | 205–206 | $C_{28}H_{36}N_2O_5$ | 69.97 / 69.98 | 7.55 / 7.84 | 5.83 / 5.70 |
| i-$C_3H_7$ | $CH_2C_6H_5$ | $N(C_2H_5)_2$ | do | 97–98 | $C_{30}H_{40}N_2O_5$ | 70.84 | 7.93 | 5.51 / 5.35 |
| i-$C_3H_7$ | $CH_2C_6H_5$ | Pyrrolidino | do | 168–169 | $C_{30}H_{38}N_2O_5$ | 71.12 / 71.00 | 7.56 / 7.86 | 5.53 / 5.76 |
| i-$C_3H_7$ | $CH_2C_6H_5$ | Morpholino | do | 205–206 | $C_{30}H_{38}N_2O_6$ | 68.94 / 68.71 | 7.33 / 7.30 | 5.36 / 5.62 |

I claim:
1. A method of alleviating pain and inflammation in a living animal which comprises administering to said animal an effective amount of a compound selected from the group consisting of
analgesically active acetamides having the formula:

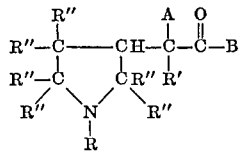

wherein R is selected from the group consisting of lower-alkyl having up to a maximum of 8 carbon atoms, cycloalkyl having up to a maximum of 9 carbon atoms, and non-toxic monocarbocyclic aralkyl having up to a maximum of 18 carbon atoms,
A is a non-toxic monocarbocyclic aryl having up to a maximum of 15 carbon atoms,
R' is selected from the group consisting of non-toxic monocarbocyclic aryl having up to a maximum of 15 carbon atoms and non-toxic monocarbocyclic aralkyl having up to a maximum of 18 carbon atoms,
R" is selected from the group consisting of hydrogen and methyl, a maximum of two R" being other than hydrogen, and
B is a disubstituted amino radical selected from the group consisting of di-lower-alkyl-amino, di-(hydroxy-lower-alkyl)-amino, lower-alkyl-(hydroxy-lower-alkyl)-amino, basic saturated monocyclic heterocyclic radicals of less than twelve carbon atoms including piperidino, lower-alkyl-piperidino, di-lower-alkyl-piperidino, lower-alkoxy-piperidino, pyrrolidino, lower-alkyl-pyrrolidino, di-lower-alkyl-pyrrolidino, lower-alkoxy-pyrrolidino, morpholino, lower-alkyl-morpholino, lower-alkoxy-morpholino, di-lower-alkyl-morpholino, thiomorpholino, lower-alkyl-thiomorpholino, di-lower-alkyl-thiomorpholino, lower-alkoxy-thiomorpholino, piperazino, lower-alkyl-piperazino, N⁴-(lower-alkyl)-C-(lower-alkyl)-piperazino, N-(hydroxy-lower-alkyl)-piperazino, N-(lower-aliphatic acyloxy lower-alkyl)-piperazino, lower-alkoxy-piperazino, N'-lower-alkoxy-lower-alkylpiperazino, and lower-carbalkoxy-piperazino, and non-toxic pharmacologically acceptable acid-addition salts thereof.

2. A method of alleviating pain and inflammation in a living animal which comprises administering to said animal an effective amount of an analgesically active alpha-monocarbocyclic aryl-alpha-monocarbocyclic aralkyl - alpha - (1-lower-alkyl-3-pyrrolidyl)-N,N-di-lower-alkylacetamide, wherein lower-alkyl contains up to a maximum of eight carbon atoms, monocarbocyclic aryl is non-toxic aryl which contains up to a maximum of 15 carbon atoms, and monocarbocyclic aralkyl is non-toxic aralkyl which contains up to a maximum of 18 carbon atoms.

3. A method of alleviating pain and inflammation in a living animal which comprises administering to said animal an effective amount of a non-toxic pharmacologically acceptable acid addition salt of an analgesically active alpha-monocarbocyclic aryl-alpha-monocarbocyclic aralkyl - alpha-(1-lower-alkyl-3-pyrrolidyl)-N,N-di-lower-alkylacetamide, wherein lower-alkyl contains up to a maximum of eight carbon atoms, monocarbocyclic aryl is non-toxic aryl which contains up to a maximum of 15 carbon atoms, and monocarbocyclic aralkyl is non-toxic aralkyl which contains up to a maximum of 18 carbon atoms.

4. A method of alleviating pain and inflammation in a living animal which comprises administering to said animal an effective amount of an analgesically active alpha, alpha - di(monocarbocyclic aryl)-alpha-(1-lower-alkyl-3-pyrrolidyl)-N,N-di-lower-alkylacetamide, wherein lower-alkyl contains up to a maximum of eight carbon atoms and monocarbocyclic aryl is non-toxic aryl which contains up to a maximum of 15 carbon atoms.

5. A method of alleviating pain and inflammation in a living animal which comprises administering to said animal an effective amount of a non-toxic pharmacologically acceptable acid-addition salt of an alpha,alpha-di-(monocarbocyclic aryl) - alpha-(1-lower-alkyl-3-pyrrolidyl)-N-di-lower-alkylacetamide, wherein lower-alkyl contains up to a maximum of eight carbon atoms and monocarbocyclic aryl is non-toxic aryl which contains up to a maximum of 15 carbon atoms.

6. A method of alleviating pain and inflammation in a living animal which comprises administering to said animal an effective amount of analgesically active alpha, alpha - diphenyl-alpha-(1-lower-alkyl-3-pyrrolidyl)-N,N-di-lower-alkylacetamide.

7. A method of alleviating pain and inflammation in a living animal which comprises administering to said animal an effective amount of a non-toxic pharmacologically acceptable acid-addition salt of an analgesically active alpha,alpha - diphenyl-alpha-(1-lower-alkyl-3-pyrrolidyl)-N,N-di-lower-alkylacetamide.

8. A method of alleviating pain and inflammation in a living animal which comprises administering to said animal an effective amount of alpha,alpha-diphenyl-alpha-(1-methyl-3-pyrrolidyl)-N,N-dimethylacetamide.

9. A method of alleviating pain and inflammation in a living animal which comprises administering to said animal an effective amount of non-toxic pharmacologically acceptable acid addition salt of alpha,alpha-diphenyl-alpha-(1-methyl-3-pyrrolidyl)-N,N-dimethylacetamide.

10. A method of alleviating pain and inflammation in a living animal which comprises administering to said animal an effective amount of alpha,alpha-diphenyl-alpha - (1 - methyl-3-pyrrolidyl)-N,N-dimethylacetamide tartrate.

11. A method of alleviating pain and inflammation in a living animal which comprises administering to said animal an effective amount of alpha,alpha-diphenyl-alpha-(1 - methyl - 3-pyrrolidyl)-N,N-dimethylacetamide fumarate.

12. A therapeutic composition suitable for the alleviation of pain and inflammation comprising (1) an effective amount of at least 0.1 milligram of an analgesically active compound selected from the group consisting of acetamides having the formula:

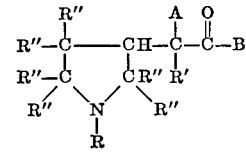

wherein R is selected from the group consisting of lower-alkyl having up to a maximum of 8 carbon atoms, cycloalkyl having up to a maximum of 9 carbon atoms, and non-toxic monocarbocyclic aralkyl having up to a maximum of 18 carbon atoms,
A is non-toxic monocarbocyclic aryl having up to a maximum of 15 carbon atoms,
R' is selected from the group consisting of non-toxic monocarbocyclic aryl having up to a maximum of 15 carbon atoms, and non-toxic monocarbocyclic aralkyl having up to a maximum of 18 carbon atoms,
R" is selected from the group consisting of hydrogen and methyl, a maximum of two R" being other than hydrogen, and
B is a disubstituted amino radical selected from the group consisting of di-lower-alkyl-amino, di-(hydroxy - lower - alkyl)-amino, lower-alkyl-(hydroxy-lower-alkyl)-amino, basic saturated monocyclic heterocyclic radicals of less than twelve carbon atoms including piperidino, lower-alkyl-piperidino, di-lower-alkyl-piperidino, lower-alkoxy-piperidino, pyrrolidino, lower-alkyl-pyrrolidino, di-lower-alkyl-pyrrolidino, lower-alkoxy-pyrrolidino, morpholino, lower-alkyl - morpholino, lower - alkoxy-morpholino, di-lower - alkyl - morpholino, thiomorpholino, lower-alkyl - thiomorpholino, di-lower-alkyl-thiomorpholino, lower - alkoxy - thiomorpholino, piperazino, lower - alkyl-piperazino, N⁴-(lower-alkyl)-C-(lower-alkyl) - piperazino, N - (hydroxy-lower-alkyl)-piperazino, N - (lower-aliphatic acyloxy lower-alkyl)-piperazino, lower - alkoxy-piperazino, N'-lower-alkoxy-lower-alkyl-piperazino, and lower-carbalkoxy-piperazino, and non-toxic pharmacologically acceptable acid-addition salts thereof, and (2) a pharmaceutical carrier.

13. A therapeutic composition suitable for the alleviation of pain and inflammation comprising (1) an effective amount of at least one milligram of an analgesically active alpha-monocarbocyclic aryl-alpha-monocarbocyclic aralkyl - alpha-(1-lower-alkyl-3-pyrrolidyl)-N,N-di-lower-alkylacetamide, wherein lower-akyl contains up to a maximum of eight carbon atoms, monocarbocyclic aryl is non-toxic aryl which contains up to a maximum of 15 carbon atoms, and monocarbocyclic aralkyl is non-toxic aralkyl which contains up to a maximum of 18 carbon atoms, and (2) a pharmaceutical carrier.

14. A therapeutic composition suitable for the alleviation of pain and inflammation comprising (1) an effective amount of at least one milligram of a non-toxic pharmacologically acceptable acid addition salt of an analgesically active alpha-monocarbocyclic aryl-alpha-monocarbocyclic aralkyl - alpha-(1-lower-alkyl-3-pyrrolidyl)-N,N-di-lower-alkylacetamide, wherein lower-alkyl contains up to a maximum of eight carbon atoms, monocarbocyclic aryl is non-toxic aryl which contains up to a maximum of 15 carbon atoms, and monocarbocyclic aralkyl is non-toxic aralkyl which contains up to a maximum of 18 carbon atoms, and (2) a pharmaceutical carrier.

15. A therapeutic composition suitable for the alleviation of pain and inflammation comprising (1) an effective amount of at least one milligram of an analgesically active alpha,alpha - di(monocarbocyclic aryl) - alpha-(1-lower - alkyl-3-pyrrolidyl)-N,N-di-lower-alkylacetamide, wherein lower-alkyl contains up to a maximum of eight carbon atoms and monocarbocyclic aryl is non-toxic aryl which contains up to a maximum of 15 carbon atoms, and (2) a pharmaceutical carrier.

16. A therapeutic composition suitable for the alleviation of pain and inflammation comprising (1) an effective amount of at least one milligram of a non-toxic pharmacologically acceptable acid-addition salt of an analgesically active alpha,alpha - di(monocarbocyclic aryl) - alpha - (1-lower-alkyl-3-pyrrolidyl)-N,N-di-lower-alkylacetamide, wherein lower-alkyl contains up to a maximum of eight carbon atoms and monocarbocyclic aryl is non-toxic aryl which contains up to a maximum of 15 carbon atoms and (2) a pharmaceutical carrier.

17. A therapeutic composition suitable for the alleviation of pain and inflammation comprising (1) an effective amount of at least about 2.5 milligrams of analgesically active alpha,alpha - diphenyl-alpha-(1-lower-alkyl-3-pyrrolidyl)-N,N-di-lower-alkyl-acetamide, and (2) a pharmaceutical carrier.

18. A therapeutic composition suitable for the alleviation of pain and inflammation comprising (1) an effective amount of at least about 2.5 milligrams of a non-toxic pharmacologically acceptable acid-addition salt of analgesically active alpha-alpha-diphenyl-alpha-(1-lower-alkyl-3-pyrrolidyl)-N,N-di-lower-alkylacetamide, and (2) a pharmaceutical carrier.

19. A therapeutic composition suitable for the alleviation of pain and inflammation comprising (1) an analgesically effective amount of at least about 2.5 milligrams of alpha,alpha - diphenyl-alpha-(1-methyl-3-pyrrolidyl)-N,N-dimethylacetamide, and (2) a pharmaceutical carrier.

20. A therapeutic composition suitable for the alleviation of pain and inflammation comprising (1) an analgesically effective amount of at least about 2.5 milligrams of non-toxic pharmacologically acceptable acid addition salt of alpha,alpha-diphenyl-alpha-(1-methyl-3-pyrrolidyl)-N,N-dimethylacetamide, and (2) a pharmaceutical carrier.

21. A therapeutic composition suitable for the alleviation of pain and inflammation comprising (1) an analgesically effective amount of at least about 2.5 milligrams of alpha,alpha - diphenyl-alpha-(1-methyl-3-pyrrolidyl)-N,N-dimethylacetamide tartrate, and (2) a pharmaceutical carrier.

22. A therapeutic composition suitable for the alleviation of pain and inflammation comprising (1) an analgesically effective amount of at least about 2.5 milligrams of alpha,alpha - diphenyl-alpha-(1-methyl-3-pyrrolidyl)-N,N-dimethylacetamide fumarate, and (2) a pharmaceutical carrier.

References Cited
UNITED STATES PATENTS

| | | | |
|---|---|---|---|
| 2,362,614 | 11/1944 | Calva | 167—22 |
| 2,547,494 | 4/1951 | Rowland | 260—326.5 |
| 2,937,118 | 5/1960 | Haxthausen | 167—65 |
| 2,975,193 | 3/1961 | Dice | 260—326.5 |
| 3,036,954 | 5/1962 | Robbins | 167—65 |

FOREIGN PATENTS 858,903  1/1961  Great Britain.

OTHER REFERENCES

Biel et. al., J.A.C.S., vol. 77, pp. 2251 and 2255 (1955).

ALBERT T. MEYERS, *Primary Examiner.*

S. J. FRIEDMAN, *Assistant Examiner.*

UNITED STATES PATENT OFFICE
CERTIFICATE OF CORRECTION

Patent No. 3,402,244                              September 17, 1968

Carl D. Lunsford

It is certified that error appears in the above identified patent and that said Letters Patent are hereby corrected as shown below:

Column 2, lines 5 to 10, right-hand portion of the formula reading "CH″" should read -- CR″ --; line 13, "cyclolakyl" shoul read -- cycloalkyl --; line 58, "tertiaryl" should read -- tertiary --. Column 6, line 43, "alpha(1-" should read -- alpha (1- --. Column 9, line 74, "1-[-alpha" should read -- 1-[alpha --. Column 13, line 16, "suspension" should read -- suspensions --. Columns 13 and 14, TABLE I, eighth column, line 3 thereof, "¹4.85" should read -- 4.85 (Basic) --; TABLE II, third column, line 3 thereof, "H(CH$_3$)$_2$" should read -- N(CH$_3$)$_2$ --. Column 16, line 9, "-N-di-" should read -- -N,N-di- --. Column 18, line 13, "alpha-alpha-" should read -- alpha, alpha- --.

Signed and sealed this 3rd day of March 1970.

(SEAL)
Attest:

EDWARD M. FLETCHER, JR.                        WILLIAM E. SCHUYLER, JR.
Attesting Officer                                     Commissioner of Patents